US009845522B2

(12) United States Patent
Paik et al.

(10) Patent No.: US 9,845,522 B2
(45) Date of Patent: Dec. 19, 2017

(54) NEGATIVE ELECTRODE FOR LITHIUM SECONDARY BATTERY AND METHOD OF MANUFACTURING THE SAME

(71) Applicants: Samsung SDI CO., Ltd., Yongin-si, Gyeonggi-Do (KR); Industry-University Cooperation Foundation Hanyang University (IUCF-HYU), Seoul (KR)

(72) Inventors: Un-Gyu Paik, Yongin-si (KR); Tae-Seup Song, Yongin-si (KR); Ki-Chun Kil, Yongin-si (KR); Byung-Joo Chung, Yongin-si (KR); Woo-Cheol Shin, Yongin-si (KR)

(73) Assignees: Samsung SDI Co., Ltd., Gyeonggi-Do (KR); Industry-University Cooperation Foundation Hanyang University (IUCF-HYU), Seoul (KR)

( * ) Notice: Subject to any disclaimer, the term of this patent is extended or adjusted under 35 U.S.C. 154(b) by 156 days.

(21) Appl. No.: 14/010,337

(22) Filed: Aug. 26, 2013

(65) Prior Publication Data

US 2014/0120416 A1    May 1, 2014

(30) Foreign Application Priority Data

Oct. 26, 2012   (KR) .................. 10-2012-0119841

(51) Int. Cl.
| | |
|---|---|
| H01M 4/36 | (2006.01) |
| H01M 4/1395 | (2010.01) |
| C22C 29/16 | (2006.01) |
| H01M 4/136 | (2010.01) |
| H01M 4/1397 | (2010.01) |
| H01M 4/58 | (2010.01) |
| C22C 32/00 | (2006.01) |
| B22F 1/00 | (2006.01) |

(52) U.S. Cl.
CPC .......... *C22C 29/16* (2013.01); *C22C 32/0068* (2013.01); *H01M 4/136* (2013.01); *H01M 4/1397* (2013.01); *H01M 4/58* (2013.01); *B22F 1/0018* (2013.01); *B22F 2201/016* (2013.01); *B22F 2201/02* (2013.01); *B22F 2998/10* (2013.01)

(58) Field of Classification Search
None
See application file for complete search history.

(56) References Cited

U.S. PATENT DOCUMENTS

| | | | | |
|---|---|---|---|---|
| 5,980,977 | A * | 11/1999 | Deng et al. .................. | 427/79 |
| 2008/0079095 | A1* | 4/2008 | Ye et al. ..................... | 257/408 |
| 2009/0169725 | A1* | 7/2009 | Zhamu et al. ............... | 427/77 |
| 2012/0064409 | A1* | 3/2012 | Zhamu et al. ............... | 429/221 |
| 2014/0203207 | A1* | 7/2014 | Jeon ...................... | H01M 4/386 |
| | | | | 252/182.1 |

FOREIGN PATENT DOCUMENTS

| | | | | |
|---|---|---|---|---|
| JP | 6-290782 | A | 10/1994 | |
| JP | 2002-356314 | a * | 12/2002 | ............. H01M 4/02 |
| JP | 2005-276821 | A | 10/2005 | |
| JP | 2006032321 | A * | 2/2006 | ............. H01M 4/58 |

OTHER PUBLICATIONS

Translation of JP2006032321A.*
Seong-Bum Son et al., "A Highly Reversible Nano-Si Anode Enabled by Mechanical Confinement in an Electrochemically Activated $Li_xTi_4Ni_4Si_7$ Matrix," *Adv. Energy Mater.* 2012, 2, 1226-1231.
Taeseup Song et al., "Arrays of Sealed Silicon Nanotubes As Anodes for Lithium Ion Batteries," 2010 American Chemical Society, *Nano Lett.* 2010, 10, 1710-1716.
Jung et al., "Nanosize Si anode embedded in super-elastic nitinol (Ni—Ti) shape memory alloy matrix for Li rechargeable batteries," *J. Mater. Chem.*, 21 (2011) pp. 11213-11216.
Korean Office Action dated Sep. 30, 2016 for Korean Patent Application No. KR 10-2012-0119841, which cites the above-identified references numbered 1-3, and from which priority is claimed by subject U.S. Appl. No. 14/010,337.

* cited by examiner

*Primary Examiner* — Basia Ridley
*Assistant Examiner* — Victoria Lynch
(74) *Attorney, Agent, or Firm* — Knobbe Martens Olson & Bear LLP

(57) ABSTRACT

In an aspect, a negative electrode for a lithium secondary battery and a method of manufacturing the same is provided. The negative electrode for the lithium secondary battery includes a negative active material layer.

8 Claims, 6 Drawing Sheets

NEGATIVE ELECTRODE FOR LITHIUM SECONDARY BATTERY AND METHOD OF MANUFACTURING THE SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims the benefit of Korean Patent Application No. 10-2012-0119841 filed on Oct. 26, 2012, in the Korean Intellectual Property Office, the disclosure of which is incorporated herein in its entirety by reference.

BACKGROUND

Field

This disclosure relates to negative electrodes for secondary batteries and a method of manufacturing the negative electrodes for secondary batteries, and more particularly, to negative electrodes for the lithium secondary batteries and methods of manufacturing the same.

Description of the Related Technology

Lithium secondary batteries are widely used in portable electronic devices such as cell phones, and notebook computers. Demand for lithium secondary batteries is expected to dramatically increase in the future due to continuing development of electronic devices. As a result, lithium batteries having better performance than conventional lithium batteries are of interest due to the increase in demand.

In general, carbonaceous materials having low electric potential such as carbon and graphite are used as negative active materials. However, a theoretical electrical capacity of the carbonaceous materials is only 372 mAh/g. As a result, new negative active materials are of interest for manufacturing high capacity batteries.

For example, silicon is considered as a next generation negative electrode material capable of replacing the carbonaceous materials as a negative electrode material for a negative electrode of a lithium secondary battery. Silicon has an advantage of high theoretical capacity of 4200 mAh/g, which is about 10 times greater than the carbonaceous materials.

However, a negative electrode including silicon may have a change in volume to about 400% during formation and disassembly of a lithium-silicon alloy. Accordingly, capacity of the battery dramatically decreases during a charge and discharge cycle such that a capacity of the battery after a fifth cycle is only 300 mAh/g, which is about 10% of an initial capacity.

A negative electrode including silicon is subjected to high structural stress due to repetitive changes in volume through a continuous charge and discharge process which may lead to cracks and disassociation of parts of the negative electrode from a current collector. As a result, a negative electrode including silicon may be mechanically very unstable. In this regard, parts of the negative electrode where cracks occur decrease electrical contacts between the particles included in the lithium secondary battery, thereby increasing contact resistance. Also, the lithium ions of dissociated parts from the current collector remain isolated and do not participate in an electrode reaction, thereby decreasing cycle performance of the battery.

Recently, manufacturing silicon into a three-dimensional nanostructure such as a nanowire or a nanotube has been investigated as describe in Song, T. et al. Nano Lett. 2010, 10, 1710 in order to potentially solve problems mentioned above. However, there is a structural limitation in achieving a high capacity battery because most of the silicon nanostructures are grown to have an irregular arrangement. Also, the silicon nanostructures are typically manufactured by using a bottom-up method including a high temperature chemical growing procedure which may be cumbersome and increase manufacturing costs.

SUMMARY

One or more embodiments include negative electrodes for lithium secondary batteries that are mechanically stable and have improved capacity, and a method of manufacturing the negative electrodes for lithium secondary batteries.

Some embodiments provide a negative electrode for a lithium secondary battery, wherein the negative electrode includes a metal matrix comprising a metal that does not react with lithium; silicon nanoparticles embedded in the metal matrix; and a metal nitride and a silicon nitride that are located on at least a portion of a surface of the metal matrix. Some embodiments provide a negative electrode for a lithium secondary battery, the negative electrode comprising: a current collector; and a negative active material layer, wherein the negative active material layer comprises: a metal matrix comprising a metal that does not react with lithium; silicon nanoparticles embedded in the metal matrix; and a metal nitride and a silicon nitride that are located on at least a portion of a surface of the metal matrix.

In some embodiments, the metal may be at least one selected from titanium (Ti), nickel (Ni), cobalt (Co), iron (Fe), chromium (Cr), hafnium (Hf), manganese (Mn), molybdenum (Mo), niobium (Nb), vanadium (V), zirconium (Zr), tantalum (Ta), tungsten (W), and rhenium (Re).

In some embodiments, the metal nitride may be $Ti_xN_yO$ ($0 \le x \le 1$, $0 \le y \le 1$). In some embodiments, the silicon nitride may be $Si_xN_yO$ ($0 \le x \le 1$, $0 \le y \le 1$). In some embodiments, the metal may be Ti or Ni.

Some embodiments provide a method of preparing a negative electrode for a lithium secondary battery including providing a current collector; nitridating a negative active material including at least one metal that does not react with lithium and silicon to prepare a nitridated negative active material; preparing a slurry for a negative electrode by mixing the nitridated negative active material with a conductor and a binder; and coating the slurry for the negative electrode on the current collector to form a negative active material layer. Some embodiments provide method of preparing a negative electrode for a lithium secondary battery, the method comprising: providing a current collector; providing a negative active material precursor comprising at least one metal that does not react with lithium and silicon; nitridating the negative active material precursor to prepare a negative active material; preparing a slurry for a negative electrode by mixing the negative active material with a conductor and a binder; and coating the slurry for the negative electrode on the current collector to form a negative active material layer.

In some embodiments, the metal may be at least one selected from Ti, Ni, Co, Fe, Cr, Hf, Mn, Mo, Nb, V, Zr, Ta, W, and Re.

In some embodiments, the negative active material may be formed of nanoparticles including Si, Ti, and Ni. In some embodiments, the negative active material precursor may be formed of nanoparticles including Si, Ti, and Ni.

In some embodiments, the nitrading the negative active material precursor may be performed by using chemical vacuum deposition.

In some embodiments, the nitridating of the negative active material precursor is processed at a temperature of about 400° C. to about 800° C.

In some embodiments, a gas may be used in the nitridating, wherein the gas is $NH_3$ gas or $N_2$ gas, or a mixture gas wherein an inert gas is mixed with the $NH_3$ gas or $N_2$ gas. In some embodiments, a gas used in the nitridating the negative active material precursor comprises a $NH_3$ gas, a $N_2$ gas or a combination thereof. In some embodiments, the gas used in the nitridating the negative active material precursor further comprises a mixture gas comprising an inert gas mixed with a $NH_3$ gas, a $N_2$ gas or a combination thereof.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments of a negative electrode, a method of preparing the same, and a lithium secondary battery including a negative electrode. In this regard, the present embodiments may have different forms and should not be construed as being limited to the descriptions set forth herein. Accordingly, the embodiments are merely described below, by referring to the figures, to explain aspects of the present description. Additional aspects will be set forth in part in the description which follows and, in part, will be apparent from the description, or may be learned by practice of the presented embodiments.

In the present specification, when a layer is "on" another layer or a substrate, the layer may be directly formed on another layer or the substrate, or there may be a third layer disposed therebetween. Also, directional expressions such as top (or upper portion), surface, or the like may be understood as bottom, bottom portion, bottom surface, or the like. Hence, spatial expressions should be understood to be relative and should not be construed to be limited to absolute directions.

Figure 1:
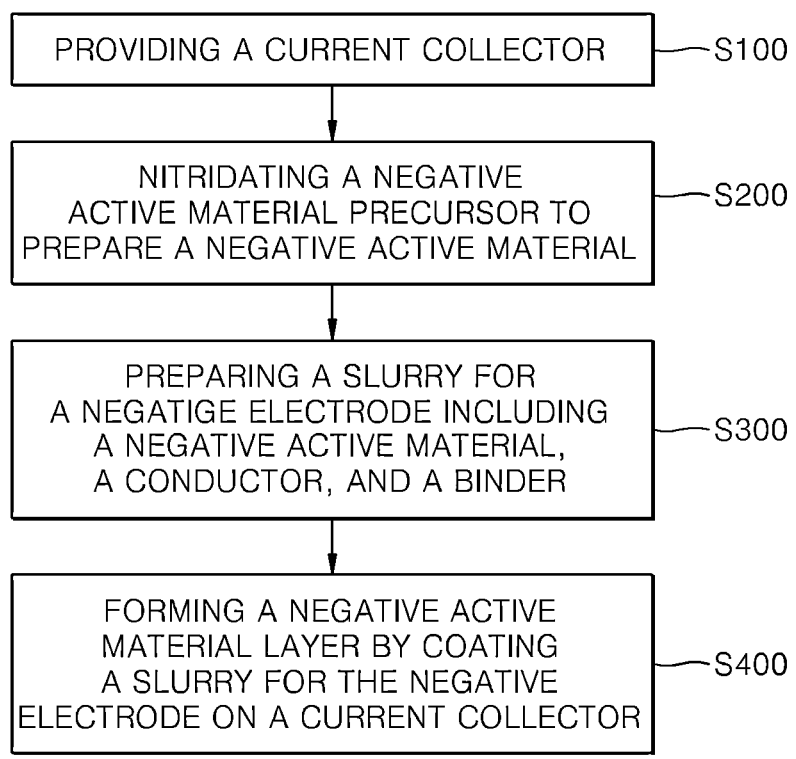
FIG. 1 is a flow chart illustrating a method of manufacturing a negative electrode for a lithium secondary battery according to an embodiment.

FIG. 1 is a flow chart illustrating a method of manufacturing a negative electrode for a lithium secondary battery according to an embodiment of the present inventive concept.

As described in FIG. 1, a current collector is provided (S100). In some embodiments, the current collector may be provided on a substrate. In some embodiments, the current collector may play a role of continuously allowing a current to flow during a charge and discharge process. In some embodiments, the current collector may be provided in a foil form. In some embodiments, the current collector may include a conductive material. For example, the conductive material may be a single metal selected from copper (Cu), aluminum (Al), nickel (Ni), iron (Fe), copper (Co), and titanium (Ti), or an alloy thereof. However, the conductive material is not limited thereto and any material that does not induce a chemical change may be used as the conductive material.

Thereafter, a negative electrode material precursor including at least one metal that does not react with lithium and silicon is prepared and the negative electrode material precursor is nitridated (S200) to form the negative electrode material. In some embodiments, the negative electrode material may be a nitridated negative electrode material.

In some embodiments, the metal may be a metal that does not react with silicon and lithium but has excellent affinity to silicon. For example, the metal may be any one selected from Ti, Ni, Co, Fe, chromium (Cr), hafnium (Hf), manganese (Mn), molybdenum (Mo), niobium (Nb), vanadium (V), zirconium (Zr), tantalum (Ta), tungsten (W), and rhenium (Re).

In some embodiments, the negative active material precursor may be obtained by, for example, dissolving particles of two or more metals and silicon particles in a solvent to obtain a ribbon shaped mixture, and pulverizing the ribbon shaped mixture by using a melt spinner. Accordingly, the negative active material precursor may be a powder of an alloy of the metal and the silicon.

In some embodiments, nitridation may, for example, be performed by using chemical vapor deposition (CVD). In some embodiments, the nitridation may be performed by inserting the negative active material in a CVD reaction chamber, supplying a nitrogen-containing gas into the CVD reaction chamber, and heating at a constant temperature under constant pressure. In some embodiments, the nitrogen-containing gas may be a nitrogen gas ($N_2$) or ammonia gas ($NH_3$). Also, a mixture gas, wherein the nitrogen-containing gas and an inert gas such as $H_2$ or Ar are mixed, may be supplied to the CVD reaction chamber. For example, the nitrogen-containing gas may be inserted at a rate of about 100 standard cubic centimeters per minute (sccm) to about 300 sccm, a pressure condition may be a normal pressure, and temperature may be about 400° C. to about 800° C. However, conditions are not limited thereto, and ranges of the conditions may be suitably adjusted according to manufacturing processes.

In some embodiments, the nitrogen gas may be supplied to a surface of the negative electrode material precursor through the nitridation. Accordingly, a metal nitride and a silicon nitride may be formed on the surface of the negative electrode material precursor. For example, the metal nitride may be $M_xN_yO$ ($0 \leq x \leq 1$, $0 \leq y \leq 1$) (wherein, M is at least one selected from Ti, Ni, Co, Fe, Cr, Hf, Mn, Mo, Nb, V, Zr, Ta, W, and Re), and the silicon nitride may be $Si_xN_yO$ ($0 \leq x \leq 1$, $0 \leq y \leq 1$).

In some embodiments, the metal nitride may improve electrical conductivity by decreasing a contact resistance of the surface of the negative active material. In some embodiments, the silicon nitride may prevent mechanical cracks from occurring at a negative electrode by controlling changes in volume during a reaction between lithium and silicon in the charge and discharge process. Accordingly, the nitridation provides an advantage of improving capacity and lifespan of the lithium secondary battery.

Thereafter, a slurry for the negative electrode is prepared (S300) by mixing a conductor and a binder with a nitridated negative active material.

For example, the slurry for the negative electrode may be prepared by adding, dispersing, and agitating the nitridated negative active material in a solvent in a certain ratio.

In some embodiments, the negative active material may be powder of an alloy of a nitridated metal and silicon. In some embodiments, the metal may be a metal that does not react with silicon and lithium but has excellent affinity to silicon. For example, the metal may be any one selected from Ti, Ni, Co, Fe, Cr, Hf, Mn, Mo, Nb, V, Zr, Ta, W, and Re.

In some embodiments, a conductor may be added to the slurry to improve conductivity of the slurry for the negative electrode. In some embodiments, the conductor may include any conductive material that does not induce a chemical change in the battery.

In some embodiments, the binder may bind the negative active material to the current collector. To increase a content of the negative active material, the binder may preferably be added in a minimum amount for binding. In some embodiments, the binder may be a water-based binder or a non-water-based binder.

For example, the binder may include carboxymethyl cellulose, methyl cellulose, vinylidene fluoride/hexafluoropropylene copolymer, polyvinilydene fluoride (PVDF), polyacrylonitrile, polymethacrylate, or a mixture thereof, or a styrene butadiene rubber-based polymer, or the like.

In some embodiments, the solvent may be used for mixing the negative active material, the conductor, and the binder. In some embodiments, the negative active material, the conductor, and the binder may be dispersed in the solvent. For example, the solvent may be N-methyl-pyrrolidone, acetone, water, or the like.

Thereafter, a negative active material layer is formed by coating the slurry for the negative electrode on the current collector (S400).

In some embodiments, the negative active material layer may be formed by, for example, coating and drying the slurry for the negative electrode including the negative active material, the conductor, and the binder on the current collector. In some embodiments, the coating may be performed by using a general method such as drop casting or doctor blade.

In the negative active material layer prepared according to the process above, the metal that does not react with lithium forms a matrix, and silicon in the matrix may have an embedded structure in the form of nanoparticles.

One or more embodiments will be described in detail with reference to the following examples. However, these examples are not intended to limit the scope of the one or more embodiments.

EXAMPLES

Preparation Example

Preparing a Negative Electrode

A copper (Cu) foil was prepared as a current collector. Separately, a ribbon shaped Si—Ti—Ni alloy was formed by using melt spinning and the ribbon shaped Si—Ti—Ni alloy was pulverized to prepare Si—Ti—Ni alloy powder. Subsequently, the Si—Ti—Ni alloy powder was inserted into a CVD reaction chamber and nitrated by injecting a $NH_3$ gas of about 200 sccm into the chamber and performing nitridation for about two hours under a normal pressure at a temperature of about 500° C. Subsequently, a slurry for the negative electrode including the nitridated Si—Ti—Ni alloy powder was prepared by dispersing the nitridated Si—Ti—Ni alloy powder as a negative active material, CMC/SBR (Carboxy Methyl Celluose/Styrene-Butadiene Rubber) as a binder, and carbon black as a conductor in water to prepare a mixture, and agitating the mixture. Thereafter, the slurry for the negative electrode was drop casted and dried to form a negative active material layer on the Cu foil.

Example

Manufacturing a Lithium Secondary Battery

A half cell of the lithium secondary battery was prepared by using the negative electrode of the Preparation Example. Here, a lithium metal was used as a counter electrode and 1.5 M of $LiPF_6$ was dissolved in a solvent where ethylene carbonate (EC)/diethylcarbonate (DEC)/fluoroethylenecarbonate (FEC) was mixed in weight percentage (wt %) of approximately 5:70:25 and was used as an electrolyte. An electrochemical characteristic of the half cell was evaluated by using a constant current-constant voltage method at a current density of 3.3 $mA/cm^2$ in a range of electric potential of about 0 V to about 2 V.

Comparative Example

A negative electrode and a half cell of a lithium secondary battery were prepared in the same manner as the Example above, except for the nitridation step of the Preparation Example was not included. Thus, the Si—Ti—Ni alloy powder was used as the negative active material.

Figure 2:
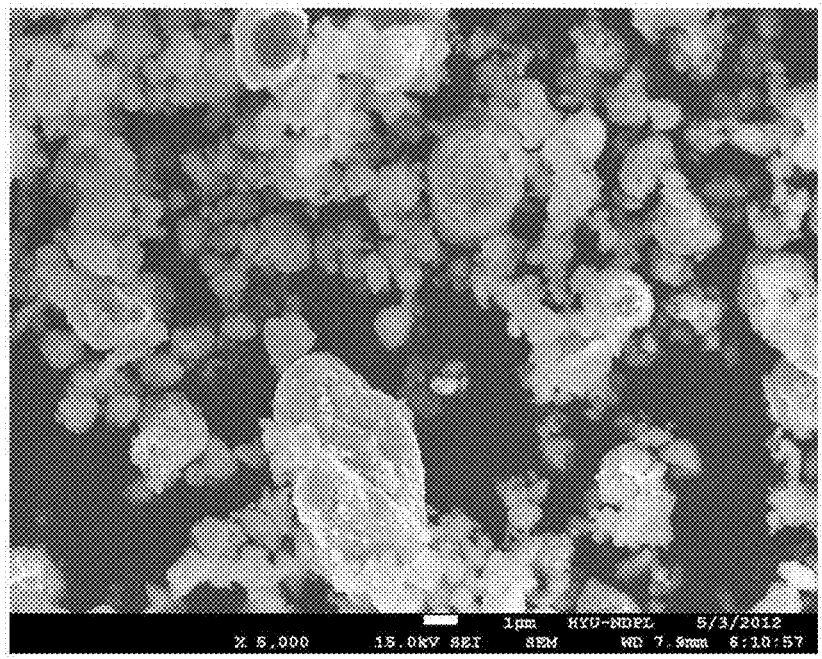
FIG. 2 is a scanning electron microscope image of a nitridated negative electrode according to an embodiment.

FIG. 2 is a scanning electron microscope image of a nitridated negative electrode material according to an aspect of the present embodiments.

Figure 3:
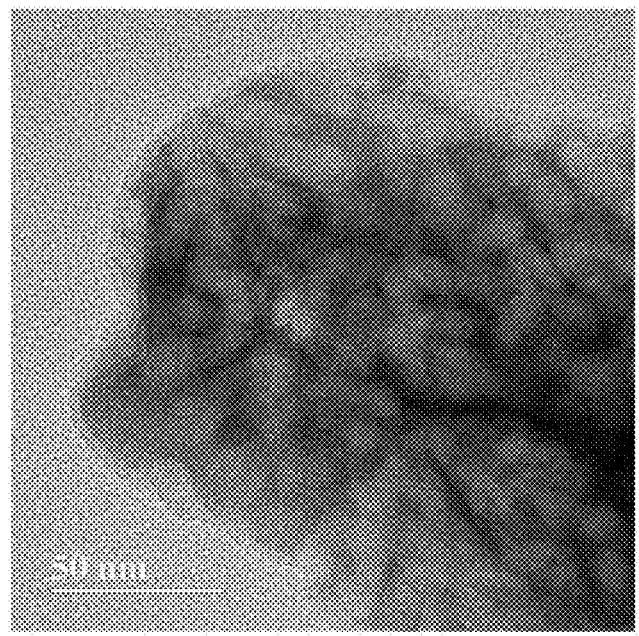
FIG. 3 is a transmission electron microscope image of a nitridated negative electrode material according to an embodiment.

FIG. 3 is a transmission electron microscope image of a nitridated negative electrode material according to an aspect of the present embodiments.

In FIGS. 2 and 3, it can be seen that a nitridated Si—Ti—Ni alloy powder has various sizes in a range of about few nm to about few μm. In some embodiments, the Si—Ti—Ni alloy powder may have sizes in a range of about 1 nm to about 10 μm. Accordingly, it can be seen that a nitridated negative active material is formed of minute particles of a Si—Ti—Ni alloy. In some embodiments, the nitrogen may be introduced to surfaces of the Si—Ti—Ni alloy particles through nitridation. Accordingly, a metal nitride and a silicon nitride may be formed on the surface of the negative active material. For example, the metal nitride may be $M_xN_yO$ ($0 \leq x \leq 1$, $0 \leq y \leq 1$)(wherein, M is at least one selected from Ti, Ni, Co, Fe, Cr, Hf, Mn, Mo, Nb, V, Zr, Ta, W, and Re), and the silicon nitride may be $Si_xN_yO$ ($0 \leq x \leq 1$, $0 \leq y \leq 1$).

Figure 4A:
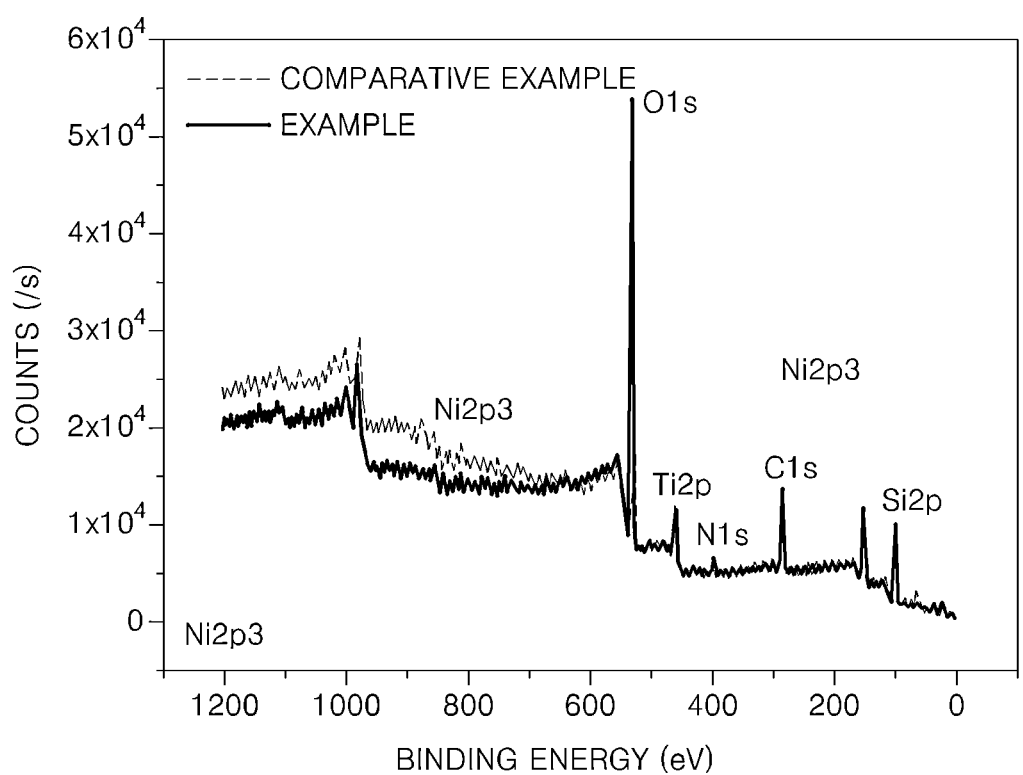
FIGS. 4A and 4B are graphs illustrating XPS analysis results of a negative electrode for a lithium secondary battery according to an embodiment.
Figure 4B:
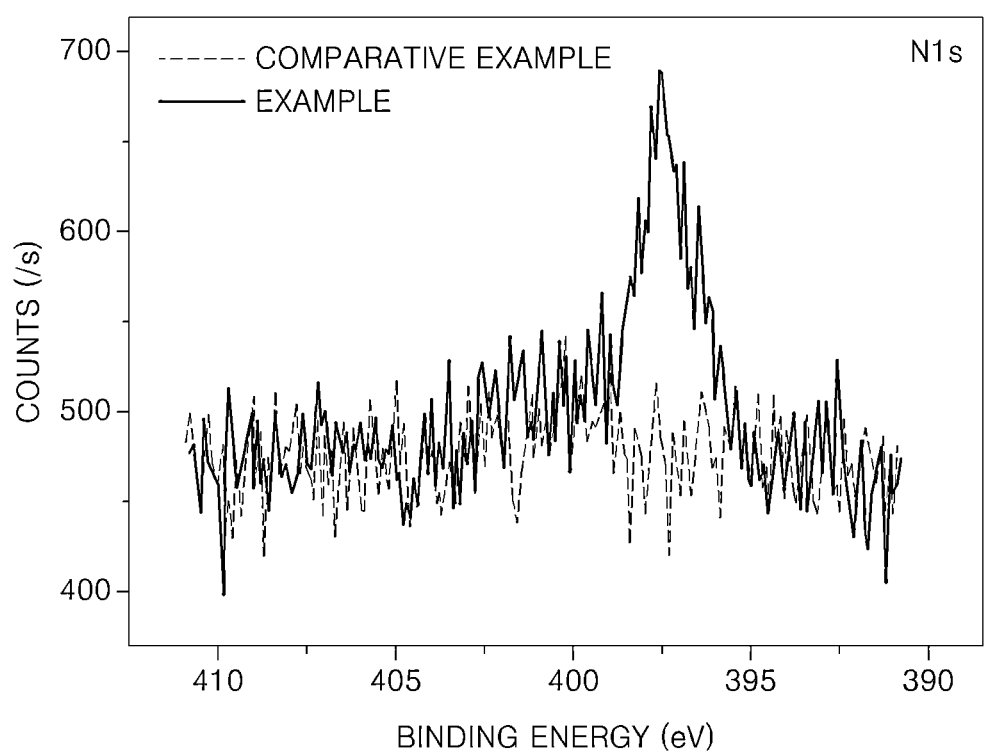

FIGS. 4A and 4B are graphs illustrating XPS analysis results of a negative electrode for a lithium secondary battery according to an embodiment.

In FIGS. 4A and 4B, an O1s peak and an N1s peak are not observed in the Comparative Example whereas a pronounced O1s peak and a pronounced N1s peak were observed in the Example. Accordingly, it can be seen that nitrogen was introduced to the surface of the negative active material layer through nitridation of the surface of the negative active material precursor.

Figure 5:
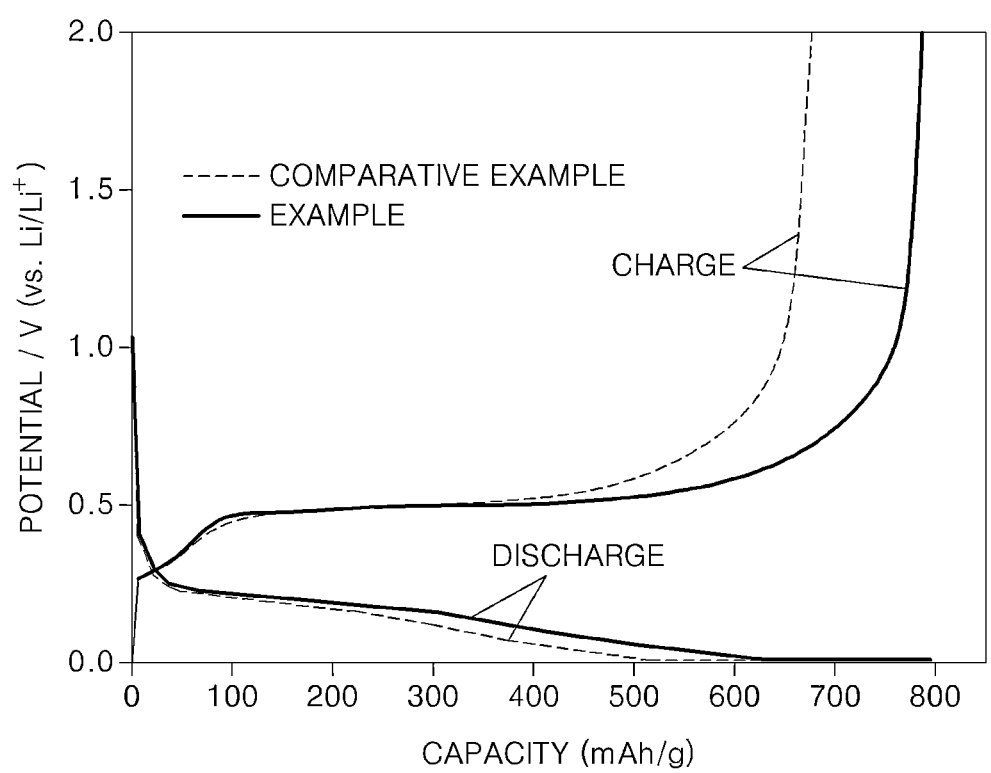
FIG. 5 is a graph illustrating charge and discharge characteristics of a negative electrode of a lithium secondary battery according the Example and the Comparative Example.

FIG. 5 is a graph illustrating charge and discharge characteristics of a negative electrode of a lithium secondary battery according to the Example and the Comparative Example.

Figure 6:
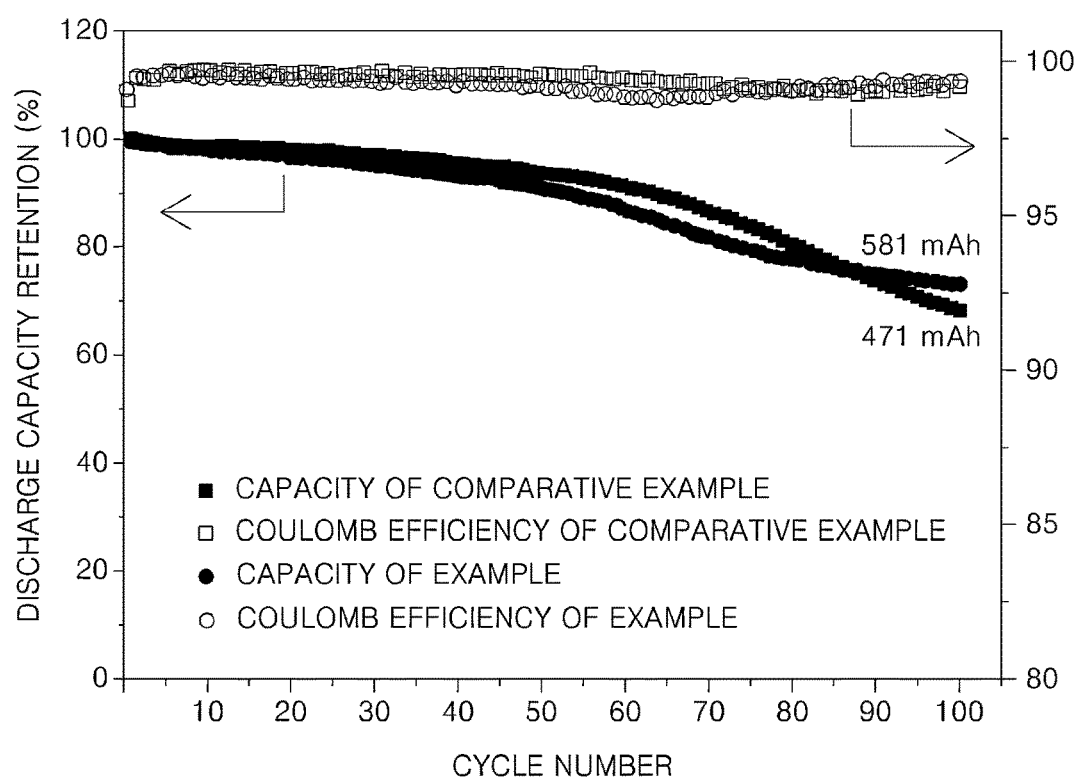
FIG. 6 is a graph illustrating discharge capacity retention and coulomb efficiency of a negative electrode for a lithium secondary battery according to the number of cycles.

FIG. 6 is a graph illustrating discharge capacity retention characteristics and coulomb efficiency of a negative electrode for a lithium secondary battery of the Example and the Comparative Example according to a number of cycles.

TABLE 1

| Types | Thickness of a negative active material layer (µm) | Capacity (mAh/g) @ 1C | Coulomb efficiency (%) | Current density (mA/cm$^2$) | Capacity retention (%) |
|---|---|---|---|---|---|
| Comparative Example | 63 | 692 | 98.7/99.2 | 3.3 | 68.0 |
| Example | 61 | 796 | 99.1/99.4 | 3.3 | 72.9 |

In Table 1, and FIGS. 5 and 6, a capacity of the Comparative Example at 1C was 692 mAh/g, whereas a capacity of the Example was 796 mAh/g. Accordingly, it can be seen that the capacity in the Example was improved by about 15% compared to that of the Comparative Example.

Also, when a charge and discharge cycle was performed up to 100 cycles, capacity retention of the Example was 72.9%, which is higher than the capacity retention of the Comparative Example, which was 68%. Also, the coulomb efficiency of the Example was higher than the coulomb efficiency of the Comparative Example.

The results above suggest that the nitrogen introduced to the surface of the negative active material layer through the nitridation reduced a contact resistance of the surface of the negative electrode, thereby improving electrical conductivity and preventing mechanical cracks occurring on the negative electrode. Accordingly, when the surface of the negative active material layer is nitridated, there is an advantage of improving the capacity and the lifespan of the battery.

According to an aspect of the present embodiments, a contact resistance may be decreased by providing electrical conductivity to a negative electrode material through nitridation, thus enhancing electrical conductivity, and mechanical cracks that may occur in a conventional negative electrode may be prevented by controlling a change in volume during a reaction between lithium and silicon in a charge and discharge process, thus substantially improving chemical and mechanical stability of an interface between the negative electrode and an electrolyte, and thereby improving capacity and lifespan of the battery.

Furthermore, the negative electrode may be manufactured more simply and easily, thereby reducing manufacturing cost.

As described above, according to the one or more of the above embodiments, a negative active material may be easily synthesized thereby reducing manufacturing cost. A lithium secondary battery with improved conductivity, discharge capacity and lifetime characteristics may be manufactured using the negative active material.

In the present disclosure, the terms "Preparation Example," "Example," and "Comparative Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A negative electrode for a lithium secondary battery, the negative electrode comprising:
   a current collector; and
   a negative active material layer, wherein the negative active material layer comprises:
      a metal matrix in a particulate form wherein the metal matrix is Si—Ti—Ni alloy;
      silicon nanoparticles embedded in the metal matrix; and
      a metal nitride and a silicon nitride that are located on at least a portion of a surface of the metal matrix,
      wherein the metal nitride is Ti$_x$N$_y$O (0<x≤1, 0<y≤1) and the silicon nitride is Si$_x$N$_y$O (0<x≤1, 0<y≤1).

2. A method of preparing a negative electrode for a lithium secondary battery, the method comprising:
   providing a current collector;
   providing a negative active material precursor comprising silicon and at least one metal that does not react with lithium;
   nitridating the negative active material precursor to prepare a negative active material in a particulate form, wherein the negative active material precursor is formed of nanoparticles comprising silicon, titanium, and nickel;
   preparing a slurry for a negative electrode by mixing the negative active material with a conductor and a binder; and
   coating the slurry for the negative electrode on the current collector to form a negative active material layer,
   wherein the negative active material layer comprises:
      a metal matrix in a particulate form wherein the metal matrix is Si—Ti—Ni alloy;
      silicon nanoparticles embedded in the metal matrix; and
      a metal nitride and a silicon nitride that are located on at least a portion of a surface of the metal matrix,
      wherein the metal nitride is Ti$_x$N$_y$O (0<x≤1, 0<y≤1) and the silicon nitride is Si$_x$N$_y$O (0<x≤1, 0<y≤1).

3. The method of claim 2, wherein the nitridating the negative active material precursor is performed by using chemical vacuum deposition.

4. The method of claim 2, wherein the nitridating of the negative active material precursor is processed at a temperature of about 400° C. to about 800° C.

5. The method of claim 2, wherein a gas used in the nitridating the negative active material precursor comprises a NH$_3$ gas, a N$_2$ gas or a combination thereof.

6. The method of claim 5, wherein the gas further comprises a mixture gas comprising an inert gas mixed with a NH$_3$ gas, a N$_2$ gas or a combination thereof.

7. A negative electrode for a lithium secondary battery, the negative electrode comprising:
   a current collector; and
   a negative active material layer, wherein the negative active material layer comprises:
      a metal matrix in a particulate form wherein the metal matrix is Si—Ti—Ni alloy;
      silicon nanoparticles embedded in the metal matrix; and
      a metal nitride and a silicon nitride that are located on at least a portion of a surface of the metal matrix,
      wherein the metal nitride is a mixture of Ti$_x$N$_y$O (0<x≤1, 0<y≤1) and Ni$_x$N$_y$O (0<x≤1, 0<y≤1), and the silicon nitride is Si$_x$N$_y$O (0<x≤1, 0<y≤1).

8. A method of preparing a negative electrode for a lithium secondary battery, the method comprising:

provide a current collector;

providing a negative active material precursor comprising silicon and at least one metal that does not react with lithium;

nitridating the negative active material precursor to prepare a negative active material in a particulate form, wherein the negative active material precursor is formed of nanoparticles comprising silicon, titanium, and nickel;

preparing a slurry for a negative electrode by mixing the negative active material with a conductor and a binder; and coating the slurry for the negative electrode on the current collector to form a negative active material layer, wherein the negative active material layer comprises:

a metal matrix in a particulate form wherein the metal matrix is Si—Ti—Ni alloy;

silicon nanoparticles embedded in the metal matrix; and a metal nitride and a silicon nitride that are located on at least a portion of a surface of the metal matrix, wherein the metal nitride is a mixture of $Ti_xN_yO$ ($0<x\le1$, $0<y\le1$) and $Ni_xN_yO$ ($0<x\le1$, $0<y\le1$), and the silicon nitride is $Si_xN_yO$ ($0<x\le1$, $0<y\le1$).

* * * * *